United States Patent [19]

Duwel et al.

[11] Patent Number: 4,506,329

[45] Date of Patent: Mar. 19, 1985

[54] NON-VOLATILE MEMORY SERIAL NUMBER LOCK FOR ELECTRONIC POSTAGE METER

[75] Inventors: Edward C. Duwel, Trumbull, Conn.; John H. Soderberg, Monroe, N.Y.

[73] Assignee: Pitney Bowes Inc., Stamford, Conn.

[21] Appl. No.: 355,437

[22] Filed: Mar. 8, 1982

[51] Int. Cl.[3] .......................... G06F 3/00; G06F 15/00

[52] U.S. Cl. .......................................... 364/464; 364/900

[58] Field of Search ........ 364/464, 466, 200 MS File, 364/900 MS File

[56] References Cited

U.S. PATENT DOCUMENTS

| | | | |
|---|---|---|---|
| 3,635,297 | 1/1982 | Salava | 177/5 |
| 3,938,095 | 2/1976 | Check, Jr. et al. | 364/200 |
| 3,978,457 | 8/1976 | Check, Jr. et al. | 364/200 |
| 4,135,240 | 1/1979 | Ritchie | 364/200 |
| 4,218,757 | 8/1980 | Drogichen | 364/900 |
| 4,251,874 | 2/1981 | Check, Jr. | 364/900 |
| 4,259,720 | 3/1981 | Campbell | 364/200 |
| 4,267,578 | 5/1981 | Vetter | 364/709 |
| 4,280,180 | 7/1981 | Eckert et al. | 364/464 |
| 4,301,507 | 11/1981 | Soderberg et al. | 364/464 |
| 4,424,573 | 1/1984 | Eckert, Jr. et al. | 364/900 |

FOREIGN PATENT DOCUMENTS

| | | |
|---|---|---|
| 19515 | 11/1980 | European Pat. Off. . |
| 2066735A | 7/1981 | United Kingdom . |

*Primary Examiner*—Jerry Smith
*Assistant Examiner*—Gary V. Harkcom
*Attorney, Agent, or Firm*—David E. Pitchenik; Joseph A. Sawyer, Jr.; William D. Soltow, Jr.

[57] ABSTRACT

A serial number lock is provided for inclusion in a non-volatile memory of an electronic postage meter. The non-volatile memory is arranged to provide a field to accommodate a postage meter serial number. The serial number is entered into the meter at the end of the manufacturing process. The postage meter includes a routine programmed into a read only memory which is used only once during the life of the meter's non-volatile memory. The routine requires the check of a non-volatile memory lock bit location which has been set once the routine has been successfully completed. The setting of this memory location prevents reentry into the one time program. The bit is set by a true comparison of the data included in a received message with the value of the data contained in non-volatile memory. The serial number message format includes an operation binary coded decimal digit as an operational indicator. If the serial number has been entered and the operational indicator set to zero, the serial number will be changed to the value contained in the data message. If the operational indicator is a one, the firmware will examine the serial number presently contained in non-volatile memory, and compare it with the value contained in the serial number message. If the result is favorable or true, the program will set the non-volatile memory lock bit thus preventing further access to this program.

13 Claims, 6 Drawing Figures

NON-VOLATILE MEMORY SERIAL NUMBER LOCK FOR ELECTRONIC POSTAGE METER

FIELD OF THE INVENTION

The present invention relates to electronic meters, and more particularily, to an electronic postage meter having a non-volatile memory adapted to contain therein a serial number for the meter.

BACKGROUND OF THE INVENTION

Electronic meter systems have been developed, as for example the systems disclosed in U.S. Pat. No. 3,978,457 for MICROCOMPUTERIZE ELECTRONIC POSTAGE METER SYSTEM, in U.S. Pat. No. 3,938,095 for COMPUTER RESPONSIVE POSTAGE METER, in U.S. Pat. No. 4,301,507 for ELECTRONIC POSTAGE METER HAVING PLURAL COMPUTING SYSTEMS and in European Patent Application, Publication No. 0 019 515 for ELECTRONIC POSTAGE METER HAVING IMPROVED SECURITY AND FAULT TOLERANCE FEATURES.

Each of the electronic postage meters disclosed in the above-identified applications and patents includes a non-volatile memory for storing critical information when power is not applied to the meter. Various types of accounting information may be stored in the meter's non-volatile memory. This information includes, for example, the amount of postage remaining in the meter for subsequent printing and the total amount of postage printed by the meter. Other types of accounting or operating data may also be stored in the non-volatile memory. The function served by the non-volatile memory circuits have replaced and enhanced the functions of the mechanical accounting registers or wheels utilized in previous mechanical type postage meters.

It has been recognized that during the assembly of electronic postage meters it may be desirable to enter the serial number into the non-volatile memory of the meter upon completion of the assembly operation. It is found that this can be done in electronic postage meters. In one such arrangement, a non-volatile memory chip number is entered into the non-volatile memory and is used during the assembly of the meter. The meter itself, however, is assembled with the final serial number on the meter body still utilizing a non-volatile memory with a given chip number entered in the serial number field. When assembly and testing is completed, the final serial number is communicated to the meter. It is also noted that a flag bit can be set if the path to the serial number in the non-volatile memory is to be closed off so that the data field in the non-volatile memory occupied by the serial number cannot be written into. That is, writing into non-volatile memory data field containing the serial number is prevented. Such a system is disclosed in U.S. patent application, Ser. No. 238,331 filed Feb. 26, 1981, now U.S. Pat. No. 4,424,573, issued Jan. 3, 1984, for Alton B. Eckert, Jr. and Edward C. Duwel, and entitled "SYSTEM FOR ENTERING A POSTAGE METER SERIAL NUMBER INTO A NON-VOLATILE MEMORY FROM AN EXTERNAL CHANNEL AFTER ASSEMBLY OF THE METER".

SUMMARY OF THE INVENTION

It has been discovered that a system should desirably be provided which enables the changing of a serial number in a meter until it is finally determined that the entered serial number is correct. This allows flexibility in case of erroneous key stroke and avoids loss in having meters fail the final assembly point because of inadvertent error which would require the entire meter to be disassembled to access the non-volatile memory in the meter.

A serial number may be entered into the meter at the end of the manufacturing process after the mèter has been assembled and the components tested by actuation of a routine programmed into a read only memory within the meter. This routine is used only once during the life of the meter non-volatile memory. The routine requires the check of a non-volatile memory bit position which is set once the routine has been successfully completed. The setting of this bit prevents reentry into the one time program. The program can be reused until the bit is set. The bit is set by comparison of the data included in a received message with the value of data contained in memory. If the comparison is true, the bit is set. The format of the received message entered into the meter to enter the serial number and set the bit requires an external message generator. The particular message format employed cannot be generated by actuation of the meter keyboard.

In accordance with a feature of the invention, the serial number message format includes one digit as an operational indicator. If the serial number has been entered and the operational indicator is set to zero, the serial number in the random access memory of the meter will be changed to the value contained in the data message. If the operational indicator is set to a one, the firmware will cause the meter to operate to examine the serial number presently contained in the random access memory image of the non-volatile memory and compare it with the value contained in the serial number message. If the result is favorable or true, the program will set the non-volatile memory lock bit image in the random access memory thus preventing further access into this program once the image is written into the meter's non-volatile memory.

BRIEF DESCRIPTION OF THE DRAWINGS

Reference is now made to the drawing wherein like reference numerals designate similar elements in the various views.

DETAILED DESCRIPTION

Figure 1:
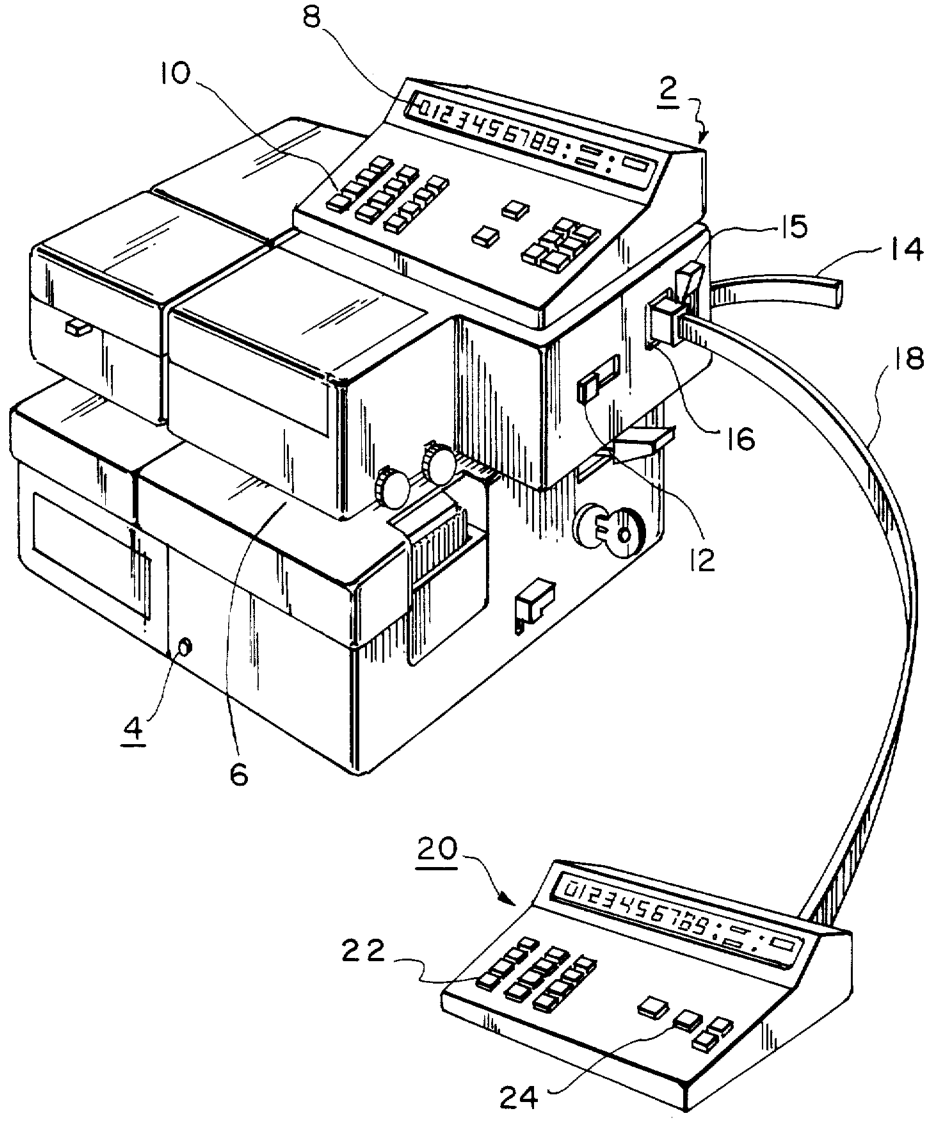
FIG. 1 is a perspective view of an electronic postage meter adapted to utilize the present invention.

Reference is now made to FIG. 1. FIG. 1 is a perspective view of a postage meter adapted to utilize the present invention. An electronic postage meter 2 is removably secured to a postage meter base 4. In this arrangement, a slot 6 is provided between the postage meter 2 and the base 4 at the forward edge thereof, for receiving envelopes or the like for the printing of postage thereon. The postage meter is provided with a display panel 8, preferably an electronic display device, as well as a control panel or keyboard 10.

The meter 2 includes a service mode switch 12. Power is applied to the meter 2 via an AC power line cord 14 when the meter power switch 15 is turned on. The meter also includes a communications port 16 which is connected by a communications cable 18 to an external message generator 20. The message generator is removable from the meter by detaching the cable 18 from the communications port 16. Communications between the meter 2 and the external message generator 20 maybe in accordance with the serial communication echoplex technique described in U.S. Pat. No. 4,301,507 for ELECTRONIC POSTAGE METER HAVING PLURAL COMPUTING SYSTEMS.

As will be explained in greater detail hereinafter, the operation of the keyboard 10 of the electronic postage meter 2 differs from that of the keyboard 22 of the external message generator 20. The external message generator keyboard 22, with its unique keys 24 can invoke a routine in a read only memory in the external message generator 20 to generate a message with a unique header and format suitable to invoke a particular function in the electronic postage meter 2. That is, the keyboard 24 of the external message generator 20 can cause a message to be generated by the external message generator and communicated over communications channel 18 to the meter to invoke a routine stored in the non-volatile memory of the electronic meter 2 which cannot be invoked by actuation of the meter keyboard 10.

Figure 2:
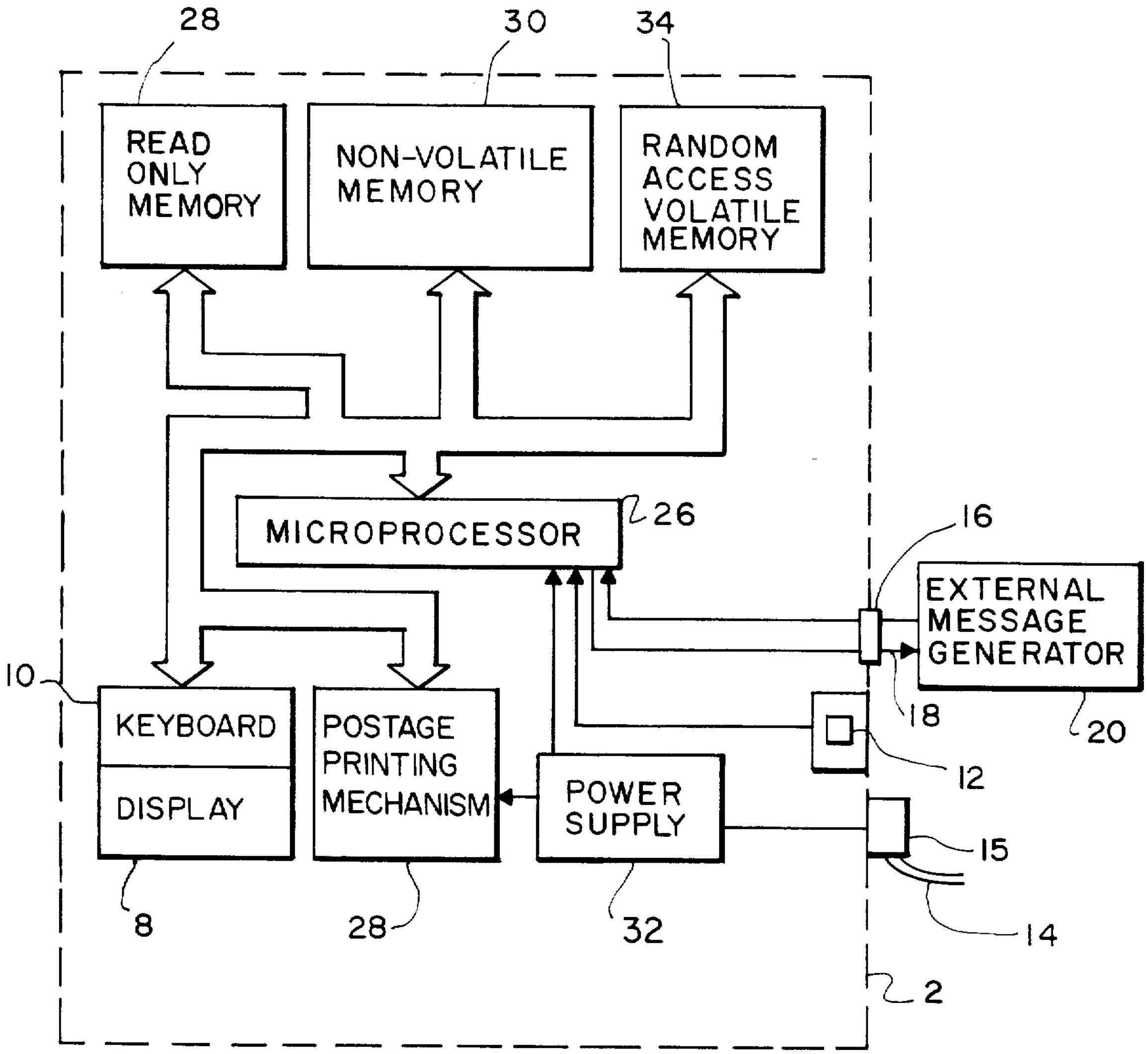
FIG. 2 is a block diagram showing one arrangement of the internal major components of an electronic postage meter embodying the present invention.

FIG. 2 which is a block diagram showing one arrangement of the internal major components of an electronic meter embodying the present invention. The electronic postage meter 2 is controlled by a microprocessor 26 operated under control of a series of programs stored in a read only memory 28. Connected to the microprocessor are the keyboard 10 and display 8 as well as a postage printing mechanism 28. The microprocessor accepts information entered via the keyboard or via the communications port 16 from an external message generator, such as information entered from the external message generator 20 over the communications channel 18. Critical accounting and other information is stored in a non-volatile memory 30. The non-volatile memory maybe an MOS semiconductor type memory, a battery augmented CMOS memory, or other suitable non-volatile memory component. The function of the non-volatile memory is to store critical postage meter data during those times when the power is not applied to the meter. This data may include, in addition to the serial number of the meter, information as to the amount of the desending register (the amount of postage available for printing), the value of the acsending register (the total amount of postage printed by the meter), and the value of the piece count register (the total number of cycles the meter has performed), as well as other types of data, such as service information, which are desired to be retained in the memory when no power is applied to the meter.

When the meter power switch 15 is turned on causing the power supply 32 internal to the meter to energize the microprocessor 26 and the postage printing mechanism 28, the information stored in the non-volatile memory is transferred via the microprocessor to a volatile random access memory 34. The volatile, random access memory 34 after power up contains an image or copy of the information stored in the non-volatile memory prior to energization. During operation of the postage meter, the data in the volatile, random access memory 34 is modified. Accordingly, when postage is printed, the descending register will be decremented, the ascending register incremented and the piece counter register incremented. When the power switch 18 is turned off, the modified image, the current updated data in the volatile, random access memory is transferred via the microprocessor back into a suitably prepared are of the non-volatile memory. Thus, the non-volatile memory is updated during the power down cycle when the power switch 15 is turned off. A like transfer of information between the non-volatile memory and the volatile random access memory also occurs when the service mode switch 12 is actuated.

Figure 3:
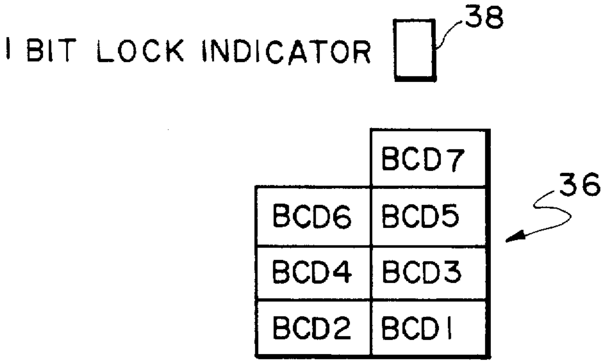
FIG. 3 is a partial memory map of the non-volatile memory shown in FIG. 2 depicting placement of the serial number and a one bit serial number lock indicator.

Reference is now made to FIG. 3. Contained in the non-volatile memory of the meter are seven nibles 36 which are reserved for the serial number. Also contained in non-volatile memory is an additional bit position 38 which is reserved for the lock indicator. The placement of the serial number is shown by the indicators of the binary coded digit, where BCD 7 is the most significant digit of the serial number and BCD 1 is the least significant digit.

When the service mode of the meter is entered via an external message, the firmware logic of the meter causes the non-volatile memory 30 to be prepared to have new or modified service data written into the non-volatile memory. The service field contains the serial number location. It should be recognized that when the present invention is utilized with electronic postage meters of the type shown in U.S. Pat. No. 4,301,507 for ELECTRONIC POSTAGE METER HAVING PLURAL COMPUTING SYSTEMS, the service mode switch described therein, as well as in U.S. Pat. No. 4,280,180 for ELECTRONIC POSTAGE METER HAVING FIELD SETTABLE CONTROL VALUES, is left in the operational mode as opposed to the service mode. This causes the external communications channel to remain operative. The entry into the service routine is achieved by the transmission of a service routine message from the external message generater 20.

It should be recognized that the purpose of the description of present invention, the meter is of the type wherein the information from non-volatile memory 30 is read during power up of the meter (when the meter power switch 15 is turned ON) and transferred back to non-volatile memory during the change from the operational to the service mode of the meter (when the meter service switch is moved from the operational to the service position). At all other times, a current copy or image of this information is in the volatile random access memory 34 of the meter. Changes are made to the image of the information in the volatile random access memory 34. During the power down of the meter (when the meter power switch 15 is turned OFF) or mode change (service to operate or operate to service), the information in the volatile random access memory 34 is written into the non-volatile memory 30.

Figure 4:
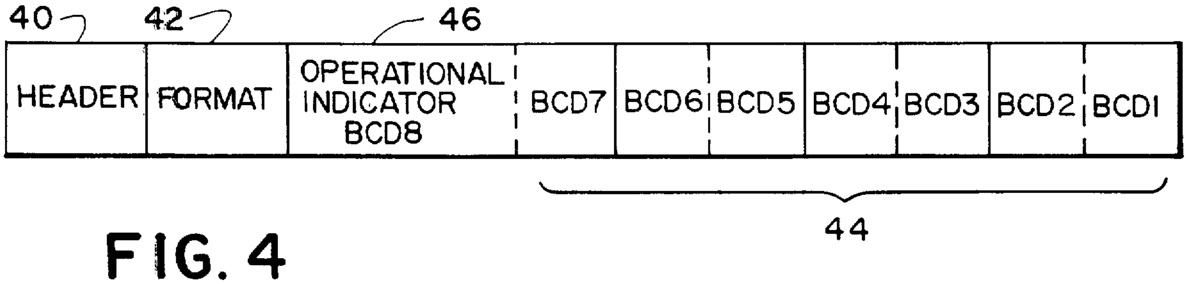
FIG. 4 is a diagramatic representation of a serial number message including an operational indicator BCD bit digit.

Reference is now made to FIG. 4. The enter serial number message consists of a one byte (eight bits) header or identifier 40, a format byte 42 and four data bytes 44 for a total of six bytes. Contained in the four data bytes 44 are a BCD operational indicator and seven binary coded digits, two per byte, representing the serial number. Header 40, format 42 and data bytes 44 are as generally described in the aforementioned U.S. Pat. No. 4,301,507. The header 40 provides identification of the unique message that is to follow, here, the fact that the message constitutes the serial number. The format byte 42 contains two BCD digits indicating the number of data digits to follow and the placement of the decimal point within these digits. In its present case of the serial number, there is no decimal point, therefore, the decimal point position indicator will be shown as containing four ones or a hex F in decimal point indicator position.

The operational indicator BCD digit 46 indicates to the meter operating under the control of the firmware program contained in the read only memory 28 which operation, a change in the serial number or lock the serial number, is to be performed. A zero will indicate a desire to change the serial number and a one will indicate a desire to lock the serial number. Codes 2 HEX thru F HEX of the operational indicator are undefined and will cause the meter to return a procedural error message.

Figure 5:
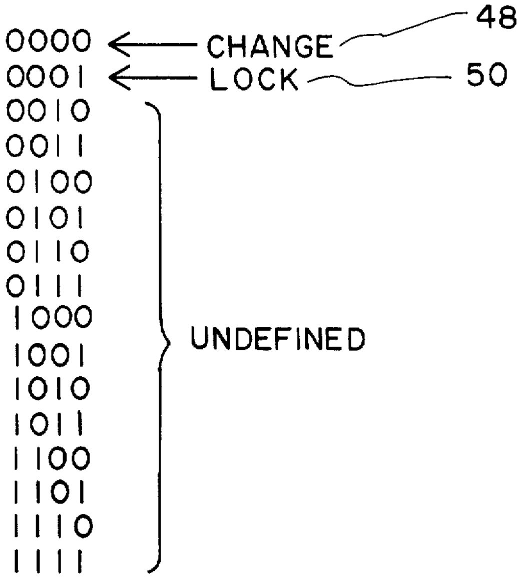
FIG. 5 is a table of codes helpful in understanding the present invention.

This is depicited in FIG. 5 wherein a table of codes is shown for the operational indicator BCD digit. Only the first two codes 48 and 50 as previously noted will cause the meter to operate in accordance with the program routine to be described hereinafter. Utilization of any of the additional codes shown will cause the meter to return an error message. This error message is a procedural error message which disappears after a timed period or reinitialization of the meter as opposed to a fatal error message which will cause the meter to become inoperative for the remainder of the power on period or to lock up. Procedural and fatal errors are described in pending U.S. Pat. No. 4,471,441 issued on Sept. 11, 1984 and filed Jan. 16, 1981 for ELECTRONIC POSTAL METER SYSTEM and assigned to Pitney Bowes Inc. and in U.S. Pat. No. 4,251,874 for ELECTRONIC POSTAGE METER SYSTEM.

Figure 6:
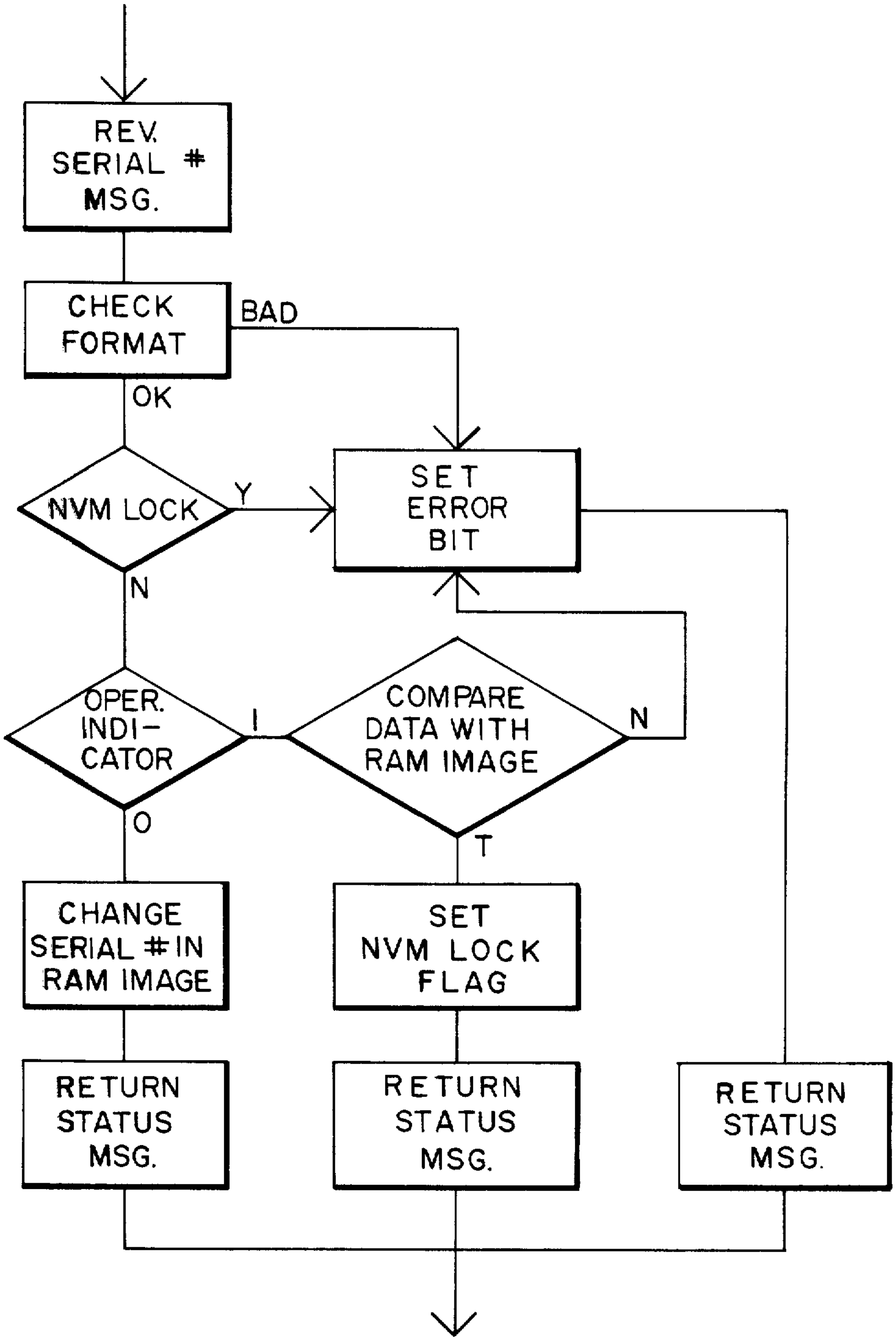
FIG. 6 is a flow chart of the firmware program of the read only memory shown in FIG. 2.

Referring now to FIG. 6, after the meter has been placed in the service mode by an externally generated message the external message (and with the service switch in the operational mode), the external message generator generates a serial number message. Upon receipt of the serial number message, the firmware program of the meter causes the meter to check the message for proper formatting and returns a procedural error message if the format is not acceptable. If the format is acceptable, the firmware program causes the meter to examine the condition of the lock bit which was stored in non-volatile memory. If this lock bit is set, the meter returns a procedural error message. If the lock bit is not set, the firmware program then causes the meter to examine the operational indicator hex digit contained in the serial number message. If the operational indicator hex digit is a zero, the meter will change the serial number information in the volatile random access memory image to correspond to the serial number contained in the message. The meter will then return a status message to the external message generator. If the operational indicator bit is set to the hex digit 1, the firmware will cause the meter to compare the serial number data in the volatile random access memory to the serial number data contained in the message. If the comparison is positive, the meter will set the non-volatile memory lock bit in its image in the volatile random access memory and return a status message to the external message generator. All other conditions that are tested and failed will return a procedural error message and will not set the non-volatile memory lock bit in its image in the volatile, random access memory.

The information containing the serial number or the serial number and lock bit contained in the data in the volatile random access memory is written into the non-volatile memory either upon power down of the meter or a mode change. Under normal conditions, the external message generator will send an exit service mode signal message to the meter. This message will cause the image in the volatile random access memory to be written into the non-volatile memory. After the procedure is completed and the external message generator has been removed from the meter, the meter can be used to check the serial number and all other checks conducted during routine manufacturing shop checks.

It should be recognized that it is known and understood as used herein the terms postage meter and postal meter refer to the general definition of a device for the imprinting of a defined unit value for governmental or private carrier, delivery such as parcels or envelopes or other like application for unit value printing. Thus, the term postage meter is utilized as it is both known and employed in the trade, as a general term for devices utilized in conjunction with services other than those exclusively provided by governmental postal services. For example, private parcel or freight services purchase and employ postal meters as a means to provide unit value printing for and such meters include accounting and printing functions.

While the present invention has been disclosed and described with reference to a single embodiment thereof, it will be apparent that the variations and modifications may be made therein, and it is intended in the following claims to cover each such variation and modification as falls within the true spirit and scope of the invention.

What is claimed is:

1. A postage meter, comprising:

printing means for printing postage;

a computing means coupled to said printing means for accounting for postage printed by said printing means;

data entry means coupled to said computing means for entering messages into said computing means;

non-volatile memory means coupled to said computing means;

a program store coupled to said computing means and adapted to store programs to control the operation of said computing means; and said program store containing a one time actuable program operable to cause said computing means to compare a serial number message including an operational indicator bit and a first serial number entered into the postage meter with a previously entered postage meter serial number and operable to cause said computing means to set lock bit preventing reentry into the program if a comparison is obtained indicating the two serial numbers are identical when an operation indicator bit in said entered serial number message is set indicating a desire to utilize the entered serial number.

2. A postage meter as defined in claim 1 wherein said program store contains a program which will cause the postage meter to generate a fatal error message which will lock the postage meter to become inoperative if a serial number message is entered into the postage meter and the lock bit has been previously set.

3. A postage meter as defined in claim 2 wherein said data entry means includes an external communications port coupled to said computing means and adapted to interact with an external message generator adapted to generate serial number messages.

4. A postage meter as defined in claim 3 further including a meter keyboard coupled to said computing means and wherein said data entry means further includes a second keyboard coupled to said computing means and wherein said serial number message includes a format which not capable of being generated from said meter keyboard.

5. A postage meter as defined in claim 1 including a volatile random access memory coupled to said computing means and wherein said one time actuable program in said program store causes said the comparison between first serial number and the previously entered serial number to be stored initially in said volatile random accesses memory and to be written into said non-volatile random access memory and to be written into said non-volatile memory means upon actuation of a switch coupled to said computing means.

6. A postage meter as defined in claim 5 where said switch is a power switch.

7. A postage meter as defined in claim 5 where said switch is a service mode switch.

8. A postage meter as defined in claim 7 wherein said computing means is a microprocessor.

9. A postage meter, comprising:
- printing means coupled to said printing means for accounting for postage printed by said printing means;
- data entry means coupled to said computing means for entering messages into said computing means;
- non-volatile memory means coupled to said computing means;
- a program store coupled to said computing means and adapted to store a predetermined program to control the operation of said computing means; and
- said program store also containing a one time actuable program operable to cause said computing means to compare a message entered into the postage meter with a previously entered message received from the data entry means and operable to cause said computing means to prevent entry into a predetermined program in said program store if a predetermined comparison is obtained between said entered message and said previously entered message indicating said two messages have a predetermined relationship and if the two messages do not have the predetermined relationship or procedural error message is returned to the computing means.

10. A postage meter, comprising:
- printing means for printing postage;
- a computing means coupled to said printing means for accounting for postage printed by said printing means;
- data entry means coupled to said computing means for entering messages into said computing means;
- non-volatile memory means coupled to said computing means;
- a program store coupled to said computing means and adapted to store programs to control the operation of said computing means; and
- said program store containing a one time actuable program operable to cause said computing means to compare a message including an operational indicator bit entered into the postage meter with a previously entered postage meter message from the data entry means and operable to cause said computing means set a lock bit preventing reentry into the one time actuable program if a comparison is obtained indicating the two messages are identical when an operational indicator bit in said entered message is set indicating a desire to utilize the entered message and if a comparison is obtained indicating the two messages are not identical a procedural error message is returned and the lock bit will not be set.

11. A postage meter as defined in claim 10 wherein said program store contains a program which will cause the postage meter to generate an error message if a message is entered into the postage meter and the lock bit has been previously set.

12. A postage meter as defined in claim 10 wherein said computing means comprises a microprocessor and where said data entry means include an external communications port coupled to said microprocessor and adapted to interact with an external message generator adapted to generate messages.

13. A postage meter as defined in claim 12 including a keyboard coupled to said computing means and wherein said message generator includes a format which is not capable of being generated from said meter keyboard.

* * * * *